United States Patent [19]

Wirth

[11] Patent Number: 5,439,077
[45] Date of Patent: Aug. 8, 1995

[54] BRAKE DISK FOR WHEEL DISK BRAKES

[75] Inventor: Xaver Wirth, Munich, Germany

[73] Assignee: Knorr-Bremse AG, Munich, Germany

[21] Appl. No.: 214,692

[22] Filed: Mar. 18, 1994

[30] Foreign Application Priority Data

Mar. 19, 1993 [DE] Germany .......... 43 08 910.0

[51] Int. Cl.$^6$ .......... F16D 55/04
[52] U.S. Cl. .......... 188/71.4; 188/218 XL; 188/250 G
[58] Field of Search .......... 188/218 XL, 18 A, 73.1, 188/73.2, 71.3, 71.4, 250 B, 250 G; 192/107 M, 197 K; 403/344

[56] References Cited

U.S. PATENT DOCUMENTS

| | | | |
|---|---|---|---|
| 2,531,696 | 11/1950 | Martin | 188/218 XL |
| 3,548,979 | 12/1970 | Nelson | 188/218 XL |
| 3,786,904 | 1/1974 | Hotchkiss | 188/218 XL |
| 3,804,213 | 4/1974 | Lucien | 188/218 XL |
| 3,902,578 | 9/1975 | Berger et al. | 188/218 XL |
| 4,004,661 | 1/1977 | Airheart | 188/218 XL |

FOREIGN PATENT DOCUMENTS 0159369  10/1985  European Pat. Off. .
1359388  7/1994  United Kingdom .

Primary Examiner—Robert J. Oberleitner
Assistant Examiner—Clifford T. Bartz
Attorney, Agent, or Firm—Barnes & Thornburg

[57] ABSTRACT

A brake disk includes a ring body in a ring groove on a side of a friction ring which is not acted upon for connecting the mutually opposite ends of friction ring segments with one another. The ring bodies prevent an expanding of the juncture caused by centrifugal force as well as a radial relative displacement of the ends of the ring segments, while a limited relative rotation of the faces of the ring segments is possible when an air gap exists at the juncture.

15 Claims, 4 Drawing Sheets

BRAKE DISK FOR WHEEL DISK BRAKES

BACKGROUND AND SUMMARY OF THE INVENTION

This invention relates to a brake disk for disk brakes and more particularly a wheel brake disk for rail vehicles. These disk brakes includes a friction ring which can be acted upon on one side by at least one brake shoe. The friction ring has at least two ring segments held on a supporting body and connecting elements which connect the opposite ends of the ring segments at the juncture of the ring segments and exclude at least radial relative displacements of the ring segments.

Many brake disks of this type are known which are constructed as divided wheel brake disks, and the supporting body is often the wheel disk of a rail vehicle wheel. A brake disk of this type is known, for example, from FIG. 4 of German Patent Document DE-B 21 33 235 or Great Britain Patent 1,359,388. The two ring segments of the friction ring are held on the wheel disk by fasteners of screws and clamping sleeves which are parallel to the axis of rotation. The juncture of the ring segments, which have an air gap, are bridged by tangential bolts constructed as the connecting elements. The ends of the bolts are in corresponding pocket bores on the faces of the ring segments. In the case of high rotational speeds of the wheel, the centrifugal forces affecting the friction ring or its ring segment attempt to expand this ring or these segments, particularly at the weak points caused by the juncture. Because of their tangential alignment, the bolt which bridge the juncture are incapable of preventing such expansions. While the bolts protrude partially from the pocket bores, the air gaps at the juncture may in this case when in an undesirable manner.

Wheel disk brakes of the above-mentioned type are also known in which, instead of the above-described bolts, tangentially aligned screwed connections are the connecting elements between the ring segments. However, such screwed connections require a relatively large amount of space. They can therefore only be implemented when the friction rings are constructed in a vented manner. That is, when they are equipped with radial cooling ribs on their side facing away from the brake shoe, or when a sufficient amount of space for these screwed connections exists on the rear of the friction rings. These types of screwed connections cannot be arranged in the case of unvented friction rings or friction rings having only short cooling ribs.

It is also known to provide semi-cylindrical recesses in the mutually opposite faces of divided friction the ring segments, respective mutually opposite. A cylindrical or circular-disk-shaped body is inserted in the recess to support the respective adjacent ring segments mutually as well as in the circumferential direction with respect to one another and also to prevent radial relative displacements. Reference is made for this purpose to German Patent Documents DE-B 22 30 805 and 24 47 555 and to German Patent Document DE-OS 26 20 623 corresponding to U.S. Pat. Nos. 3,804,213; 3,902,578 and 4,004,661 respectively.

It is an object of the invention to further develop a segmental friction ring brake disk by simple devices that prevents expansion of the juncture between the two ring segments under the occurrence of high centrifugal forces or other forces, prevents relative radial displacements and virtually no additional space is required for the connecting elements so that the brake disk can also be constructed in an unvented manner or with only short cooling ribs.

According to the invention, this object is achieved in that the friction ring has, on at least one side, ring grooves which are open to this side and bridge the juncture of the ring segments. The axes of these ring grooves extend parallel to the axis of the friction ring and their depth is less than the axial width of the ring segments. A ring body is inserted into each ring groove and bridges the juncture. Preferably, the ring body fills the ring groove.

This construction of the brake disk provides a connection at the juncture between the ring segments which can be stressed not only with respect to pressure forces, shearing forces and radial displacement forces, but the connection can also absorb tensile forces. As a result, the adjacent ring segments obtain a fixed but flexible connection to one another such that their fastener device on the supporting body is relieved of certain stress components, such as stress caused by centrifugal force, and can therefore be dimensioned to be correspondingly weaker and smaller. It is important that, by the ring bodies connecting the ring segments, temperature-caused deviations of the ring segments from their circle-segment-shaped desired design are not hindered because the connecting elements formed by the ring bodies act as joints which permit, to a limited extent, relative rotating movements of the faces of the ring segments, which are opposite one another in the juncture, about the axis of the ring bodies.

Other objects, advantages and novel features of the present invention will become apparent from the following detailed description of the invention when considered in conjunction with the accompanying drawings.

DESCRIPTION OF THE PRETERMED EMBODIMENTS

Figure 1:
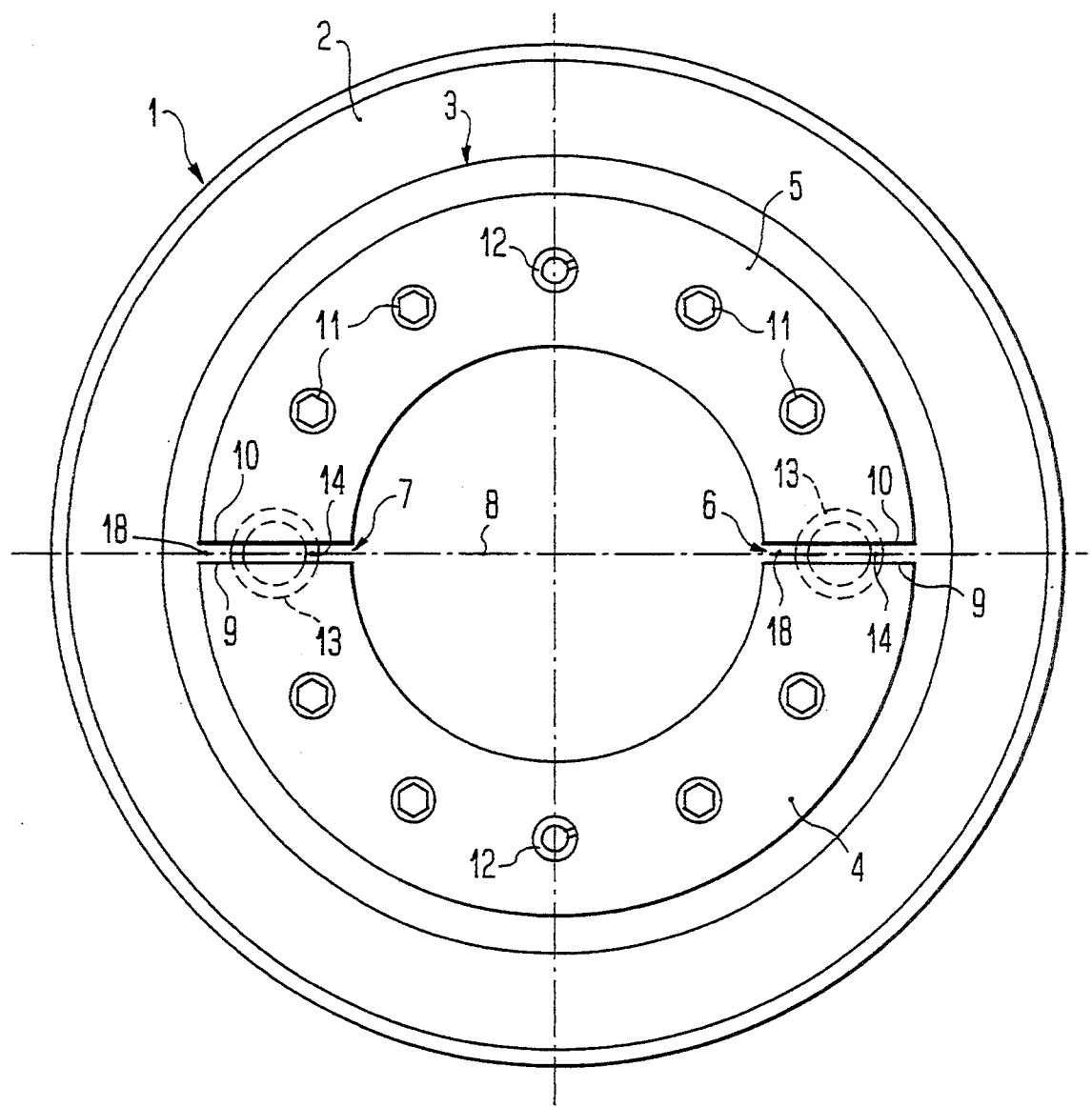
FIG. 1 is a view of a wheel brake disk on a rail vehicle wheel according to the principles of the present invention.
Figure 3:
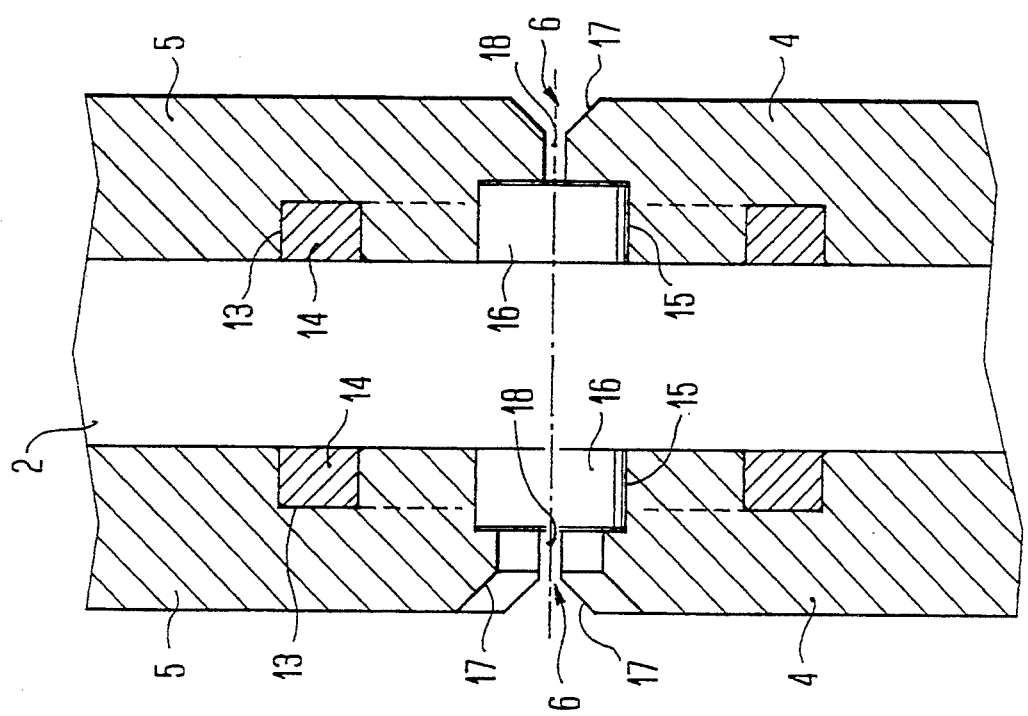
FIG. 3 is a further enlarged sectional view according to Line A—A in FIG. 2.

FIG. 1 illustrates a wheel 1 of a rail vehicle which carries a brake or friction ring 3 on its wheel disk 2 for forming a brake disk. The hub portion of the wheel 1 is not shown. The brake ring 3 is divided into two half ring segments 4 and 5. The junctures 6 and 7 of the adjacent edges of the two ring segments 4 and 5 are in a common plane 8 which contains the axle of the wheel 1. In the area of juncture 6 and 7, the essentially parallel faces 9 and 10 of the ring segments 4 and 5 are opposite and spaced from one another. The two ring segments 4 and 5 are held on the wheel disk 2 by fasteners for example, screws 11 or clamping sleeves 12 which are parallel to the axle of the wheel 1. In a customary manner, a brake shoe, which is not shown, can be pressed against the friction ring 3 for the purpose of braking. The friction ring 3 or the ring segments 4 and 5 may be provided with ventilation devices facing the wheel disk 2, for example radially directed cooling air ribs, for conveying a cooling air flow between the friction ring 3 and the wheel disk 2. Also, the wheel 1 may be provided with a friction ring arrangement which corresponds to the friction ring 3 on its side facing away from FIG. 1 as shown in FIG. 3.

To the extent so far described, the brake disk corresponds to the state of the art as indicated, for example, by FIG. 1 of the above-mentioned German Patent Document DE-B 21 33 235.

A pair of ring grooves 13 which bridges a respective junctures 6 and 7 are formed in the friction ring 3. The ring segments 4 and 5 each include an approximately semicircular ring groove section of the ring groove 13 whose diameter is at the faces 9 and 10. A ring body 14 is inserted in each ring groove 13, bridges the junctures 6 and 7 and joins the ring groove sections. The ring body 14 at least almost completely may be disposed in the ring groove 13 with or without prestress. For example, ring body 14 may be disposed in the ring groove 13 by a pressfit or by a close sliding fit. The sectional view of FIG. 3 clearly shows the ring body 14 in the ring groove 13.

The ting bodies 14 connect the two ring segments 4 and 5 at their junctures 6 and 7 such that tensile forces, pressure forces and shearing forces acting in the radial direction are transmitted between the faces 9 and 10. However, the faces 9 and 10 can slightly rotate about the axis of the ring body 14 out of their position in parallel with the plane 8. Thus, a radial displacement of the ends of ring segment ends 4 and 5 relative to one another is made impossible and that the center spacing 18 of the mutually opposite faces 9 and 10 at the juncture 6 and 7, can neither increase nor decrease, although limited rotations of the faces 9 and 10 relative to one another are possible. This eliminating of radial movement of the ring segments 4 and 5 under the effect of centrifugal forces at high rotational speeds substantially reduces additional stress on the fasteners, that is, the screws 11 or the clamping sleeves 12. However, heat-caused expansions of the ring segments 4 and 5 with minimal relative rotations of the faces 9 and 10 with respect to one another are possible without any distortions.

The brake disk 2 may be manufactured from an individual friction ring 3. Thus, a single unmachined blank may be used for manufacturing of brake disks with undivided and divided friction ring constructions. In this case, the ring grooves 13 may expediently be entered into the undivided friction ring. Then the friction ring 3 would be divided into the ring segments 4 and 5. The ring bodies 14 would be inserted subsequently. The ring body 14 may be made of a material which differs from the material of the friction ring 3, for example, of a high-strength material. Deviating from the representation according to FIG. 1, it is possible to divide the friction ring 3 into more than two ring segments 4 and 5 joined by ring bodies 14 in ring grooves 13.

In the embodiment according to FIG. 1, the ring grooves 13 are situated on the side of the friction ring 3 which is not acted upon by the brake shoe. However, the ring grooves and ring bodies 14 may also be situated alone or additionally on the side of the friction ring which is acted upon by the brake shoe. Furthermore, according to this embodiment, only one ring groove 13 and a ring body 14 is provided at the junctures 6 and 7. The outside diameter of the ring groove 13 corresponds approximately to half the radial width of the friction ring 3 and is centered with respect to the radial width of the friction ring 3. It is also possible to arrange several ring grooves 13 and ring bodies at the junctures 6 and 7, which have smaller diameters and are distributed along the radial width of the friction ring 3. However, this excludes the relative rotatability of the faces and 10. In order to retain this relative rotatability, several axial ring grooves 13 and ring bodies 14 of different diameters may be concentrically arranged. In this case, the axial depth of the ring grooves 13 on the side of the friction ring 3 which is not acted upon are dimensioned such that it is smaller than the axial width of the ring segments 4 and 5 in their final worn-out condition. As a result, it is made impossible that the ring grooves 13 are ground open when the friction ring 3 is worn out.

Figure 2:
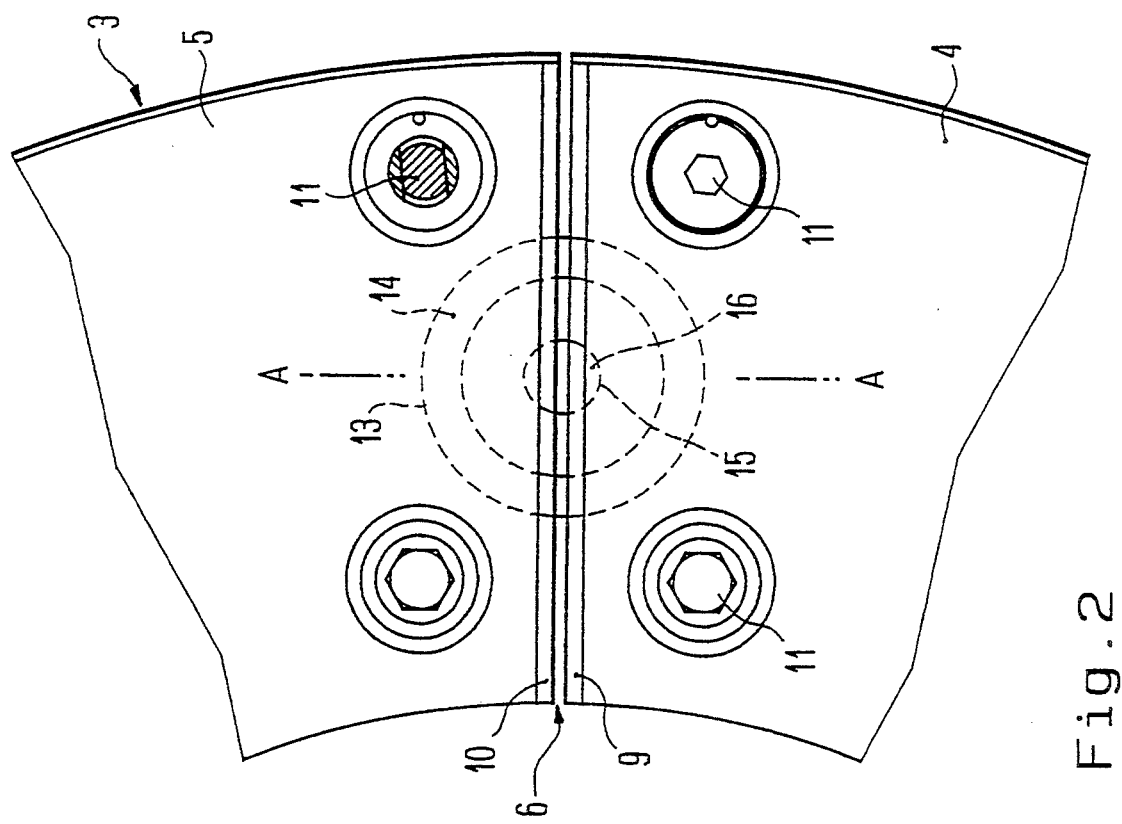
FIG. 2 is an enlarged partial cut-out view of another embodiment, showing only a juncture according to the principle of the present invention.

The construction of the brake disk according to FIGS. 2 and 3, which show only juncture 6, corresponds largely to the construction according to FIG. 1. Adjacent to the junctures, the ring segments 4 and 5 are held by two screws 11 respectively, which are used as bolt-type fasteners, and which are offset radially with respect to the ring groove 13. The screws 11 do not have to have an identical construction and be designed for absorbing thermal expansions. The cut-away of the fastener shows a construction according to European Patent Document EP-B 0 159 639.

In the case of the brake disk according to FIG. 2 and 3, the friction ring 3 is provided with cylindrical recesses 15 which are coaxial and concentrically interior to the ring grooves 13. The recesses 15 include an approximately semi-cylindrically portion in the faces 9 and 10 of two ring segments 4 and 5. The recesses are open, at least toward the side of the friction ring 3 that is not acted upon, as illustrated in FIG. 3. According to the left-sided representation of FIG. 3, the recesses 15 has a reduced diameter portion which opens in the direction of the side of the friction ring 3 which is acted upon by the brake clip. The opening of the reduced diameter portion is bevelled approximately for the depth of the wearing range of the friction ring 3. A circular disk 16 is disposed in and at least almost completely fills the cylindrical recesses 15. FIGS. 2 and 3 also show that the transition from the surface of the ring segments 4 and 5, which can be acted upon by the brake shoe to their faces 9 and 10 is bevelled by slanted surfaces 17.

Figure 6:
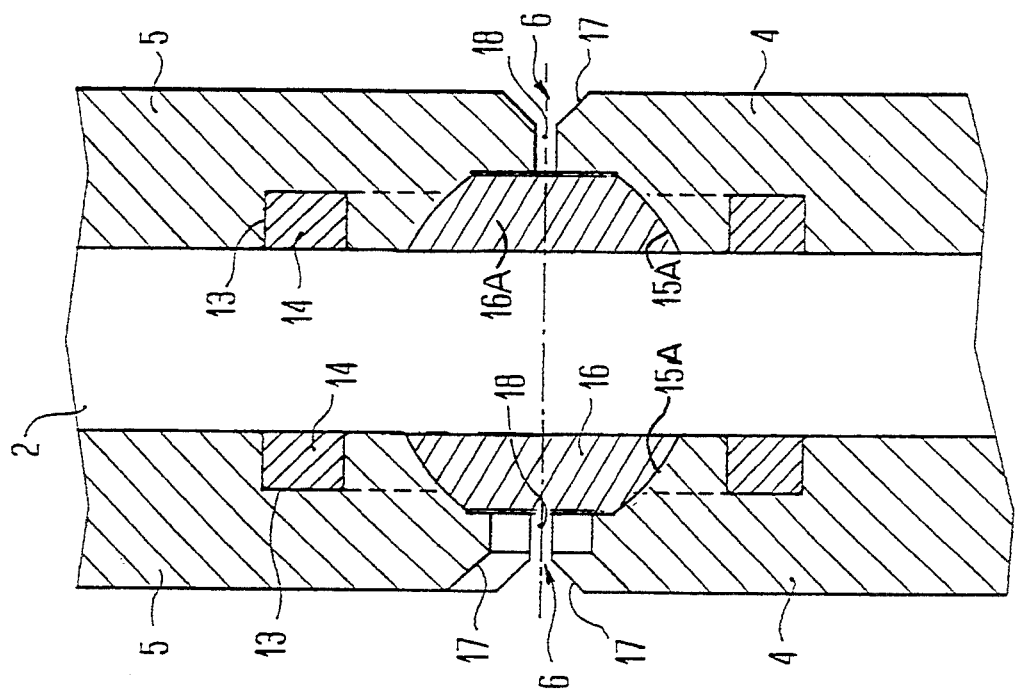
FIG. 6 is an enlarged cross-sectional view similar to FIG. 2 of another embodiment of a spherical recess and ball at the juncture.

As a modification, it is possible to replace the cylindrical recess 15 by a spherical recess 15a and the circular disk 16 by a ball 16a which fills the spherical recess at least almost completely as illustrated in FIG. 6.

Figure 4:
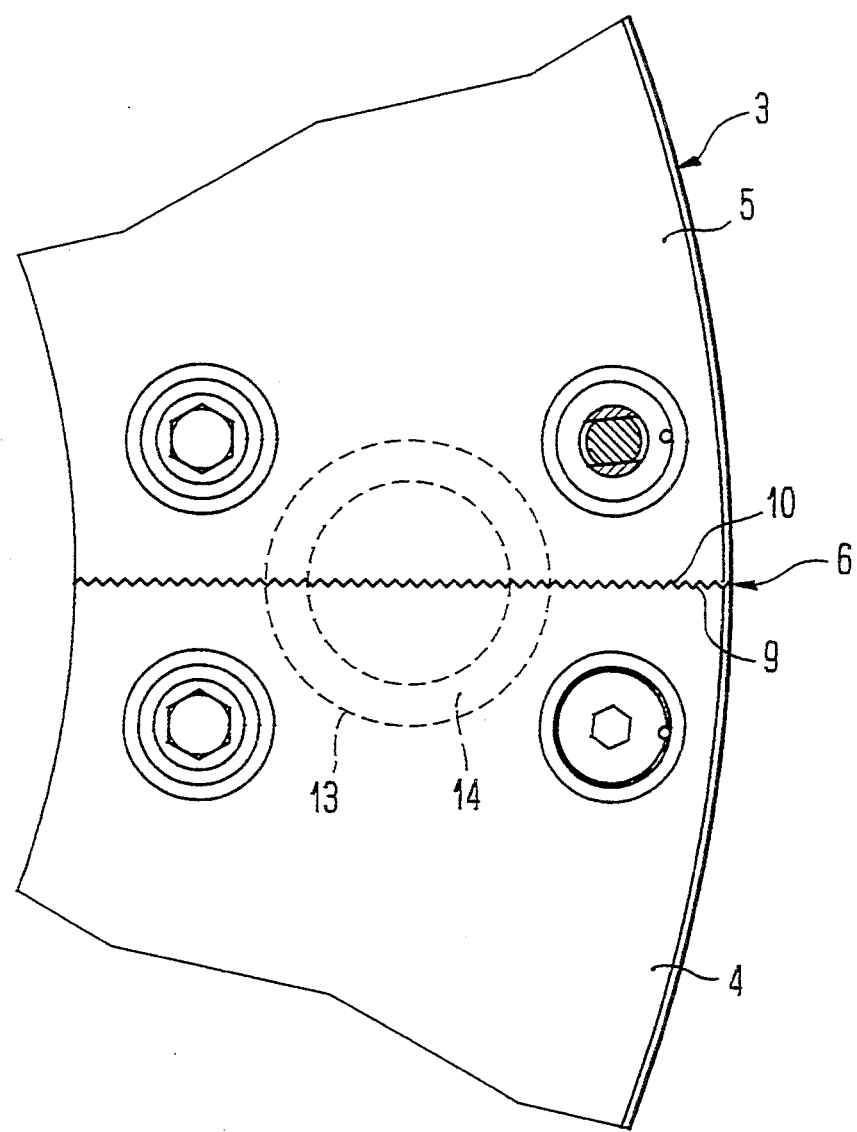
FIG. 4 is an enlarged partial cut-out view similar to FIG. 2, of another embodiment according to the principles of the present invention.

The above-described embodiments of FIG. 1–3 each have air gaps 18 at the junction points 6 and 7. In order to join the ring segments 4 and 5 to form a friction ring 3 which is largely rigid in itself, a construction of the junctures 6 and 7 according to FIG. 4 is expedient. The opposite faces 9 and 10 of the two ring segments 4 and 5 are constructed to mate or engage in one another by a toothing and to rest against one another. In combination with the ring body 14 inserted into the ring groove 13, the toothing ensures the absorption and transmission of high shearing forces at the junctures 6 and 7. When the ring segments 4 and 5 are manufactured, the toothing can be produced by breaking an individual ring-shaped starting body. In this case, the roughness of the break represents an excellent toothing in all direction of the plane of the juncture 6 and 7.

Figure 5:
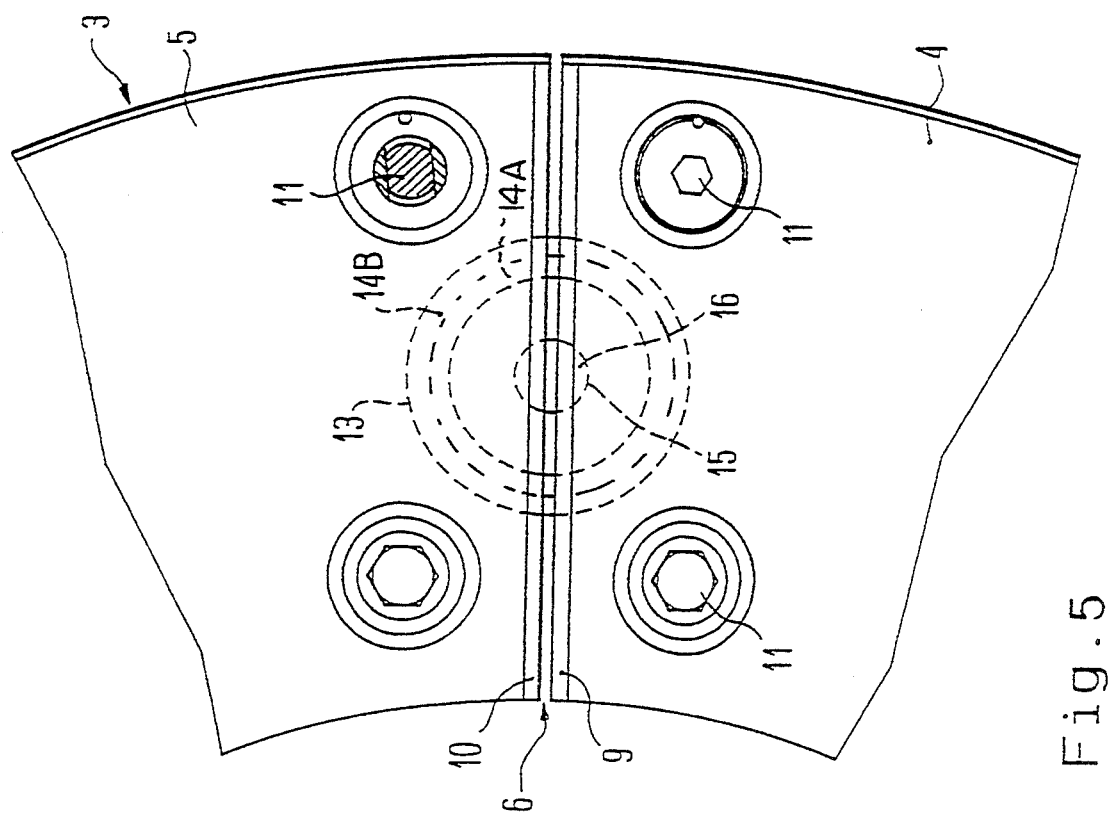
FIG. 5 is an enlarged partial cut-away view similar to FIG. 2 of another embodiment of the ring bodies.

Deviating from the above-described embodiments, the ring body 14 inserted into a ring groove 13 may be composed of several concentric individual rings illustrated in FIG. 5 as 14A and 14B. As a result, the ring body 14 becomes more bendable in its cross-section, and thereby better adapt to possibly occurring elastic deformations of the ring groove 13. It is also possible to manufacture the ring body 14 from a fiber reinforced material. The cross-section of the ring groove 13 and of the ring body 14 may differ from the rectangular shape cross-sections illustrated in FIG. 3. It may be semicircular or U-shaped or of a similar cross-sectional shape. When an incomplete filling of the shown ring groove is accepted, the ring body 14 may also have a circular or oval cross-section.

With respect to the junctures 6 and 7, the construction according to the invention can also be carried out in the case of axle disk brakes with a divided friction ring 3. The supporting body in this case is generally part of a hub portion. Although rail vehicles have been mentioned, it is but an example of the type of disk brakes the present invention may be used. The present invention can be used on any vehicle disk brake.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. A brake disk for a disk brake comprising:
    a friction ring having at least two friction ring segments and a first side to be acted upon and a second side not to be acted upon by at least one brake shoe;
    ring grooves opening with respect to at least one side of said friction ring and bridging junctures of adjacent ends of said friction ring segments;
    said ring grooves having coaxial walls along an axis of said friction ring and having a depth less than an axial width of said ring segments; and
    a ring body in each of said ring grooves and bridging said junctures for preventing at least radial movement of said ring segments relative to each other.

2. A brake disk according to claim 1, wherein the ring grooves are situated only on the second side of the friction ring; and
    the ring groove's depth is less than the axial width of the ring segments in their worn-out end condition.

3. A brake disk according to claim 1 wherein:
    said junctures have an axis which is radial with respect to the brake disk; and
    only one ring groove is at each juncture, the location of the ring groove being symmetrical with respect to the juncture and the radial width of the ring segments.

4. A brake disk according to claim 3, wherein the outside diameter of the ring groove corresponds approximately to half the radial width of the ring segments.

5. A brake disk according to claim 3, including at least two fastener apertures in the ring segments adjacent and radially offset with respect to each of the ring grooves for receiving fasteners which hold said ring segments to supporting body.

6. A brake disk according to claim 1, including:
    a cylindrical recess in the friction ring segments which is coaxial and concentrically interior a ring groove and which is open at least to the second side of the friction ring; and
    a circular disk in and almost completely filling said cylindrical recess.

7. A brake disk according to claim 6, wherein the cylindrical recess opens with a reduced cross-section toward the first side of the friction ring and is bevelled along approximately the depth of the wearing area of the friction ring.

8. A brake disk according to claim 1 including:
    a spherical recess in the friction ring segments which is centrically and interior to the ring groove; and
    a ball in and almost completely filling the spherical recess.

9. A brake disk according to claim 1, including an air gap between opposite faces of two ring segments at the juncture, and the ring body bridges the air gap.

10. A brake disk according to claim 9, wherein the transition from the first surface of a ring segment to its face at the juncture is beveled.

11. A brake disk according to claim 1 wherein said ring groove includes a semicircular ring groove segment in adjacent ends of the ring segments at the juncture.

12. A brake disk according to claim 1 wherein said ring body is a plurality of concentric ring bodies in a ring groove.

13. A brake disk according to claim 1 wherein said ring body fills a ring groove.

14. A brake disk for a disk brake comprising:
    a friction ring having at least two friction ring segments and a first side to be acted upon and a second side not to be acted upon by at least one brake shoe;
    opposite faces of two ring segments at their juncture engaging one another by mated toothing;
    ring grooves opening with respect to at least one side of said friction ring and bridging junctures of adjacent ends of said friction ring segments;
    said ring grooves having an axis parallel to an axis of said friction ring and having a depth less than an axial width of said ring segments; and
    a ring body in each of said ring grooves and bridging said junctures for preventing at least radial movement of said ring segments relative to each other.

15. A brake disk according to claim 14, wherein in that the two ring segments are from a single ring body broken to form the toothing.

* * * * *